(12) United States Patent
Barrera et al.

(10) Patent No.: US 10,573,162 B1
(45) Date of Patent: Feb. 25, 2020

(54) TRACKING SMART DEVICES IN VEHICLES TECHNICAL FIELD

(71) Applicant: Ford Global Technologies, LLC, Dearborn, MI (US)

(72) Inventors: Oswaldo Perez Barrera, Texcoco (MX); Hedy H Morales Bolaños, Naucalpan (MX); Alvaro Jimenez, Miguel Hidalgo (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/107,625

(22) Filed: Aug. 21, 2018

(51) Int. Cl.
*G08B 21/24* (2006.01)
*H04W 64/00* (2009.01)
*B60N 2/00* (2006.01)
*B60R 25/31* (2013.01)
*B60R 25/24* (2013.01)

(52) U.S. Cl.
CPC ............. *G08B 21/24* (2013.01); *B60N 2/002* (2013.01); *B60R 25/245* (2013.01); *B60R 25/31* (2013.01); *H04W 64/003* (2013.01)

(58) Field of Classification Search
CPC .................................... G05D 1/00; G08B 1/00
See application file for complete search history.

(56) References Cited

U.S. PATENT DOCUMENTS

| | | | |
|---|---|---|---|
| 2016/0332535 A1* | 11/2016 | Bradley | B60N 2/002 |
| 2017/0080900 A1 | 3/2017 | Huennekens et al. | |
| 2017/0263123 A1* | 9/2017 | Sachdev | H04W 4/046 |
| 2017/0291539 A1 | 10/2017 | Avery | |
| 2018/0276974 A1* | 9/2018 | Talty | G08B 21/24 |
| 2019/0197325 A1* | 6/2019 | Reiley | G06K 9/00832 |

FOREIGN PATENT DOCUMENTS

CN 106845659 A 6/2017
WO 2017/099734 A1 6/2017

* cited by examiner

*Primary Examiner* — Shirley Lu
(74) *Attorney, Agent, or Firm* — Brandon Hicks; Eversheds Sutherland (US) LLP

(57) ABSTRACT

Systems, methods, and computer-readable media are disclosed for detecting that smart device were left in vehicles and facilitating retrieval of such devices. Example methods may include determining that the vehicle has arrived at a destination. The method may further include determining that a first device of the user is no longer disposed in the vehicle while a second device associated with the user is still disposed in the vehicle. The method may include exchanging one or more indications associated with retrieval of the first device.

18 Claims, 5 Drawing Sheets

TRACKING SMART DEVICES IN VEHICLES

TECHNICAL FIELD

The present disclosure relates to systems, methods, and computer-readable media for tracking smart devices in vehicles.

BACKGROUND

Autonomous vehicles can be used to transport users to desired destinations. Smart devices, for example smartphones and tablets have become more common and omnipresent than ever before. Users carry them throughout the day, and are regularly utilizing them for the variety of functions they are able to perform. For example, smart devices may be used to request a ride, such as via a taxi or ride service, that may include a human-operated or autonomous vehicle. It happens that during the ride the passenger is using the smart device, and then after completing the ride, the passenger accidently leaves the smart device in the vehicle. However, the passenger may not realize they left the smart device for some time, well after the vehicle has left the location where the passenger disembarked. Retrieval of a left smart device may be complicated, time consuming, and may not ultimately be successful.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the disclosure include systems and methods for tracking smart devices and determining whether smart devices were left in a vehicle. While embodiments of the present disclosure are described in connection with autonomous vehicles providing ride services, they may be practiced in human-operated vehicles, for example, in vehicles provided by car sharing services.

Embodiments of this disclosure generally relate to systems, methods, and computer-readable media for tracking smart devices in vehicles, particularly vehicles associated with ride services, and where smart devices have been left in a vehicle, then providing alerts and instructions for retrieval of the smart device left in a vehicle. Example methods may include determining, by a mobile device connected via a wireless connection to a vehicle, that the vehicle has arrived at a destination. The method may further include determining, by the mobile device, that a wearable device of the user is no longer disposed in the vehicle while the mobile device is still disposed in the vehicle. Thereafter, the wearable device can pair to the mobile device via the wireless connection. The method may further include, based on the determination, sending, by the mobile device to the wearable device, at least one alert concerning the mobile device.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

Figure 1:
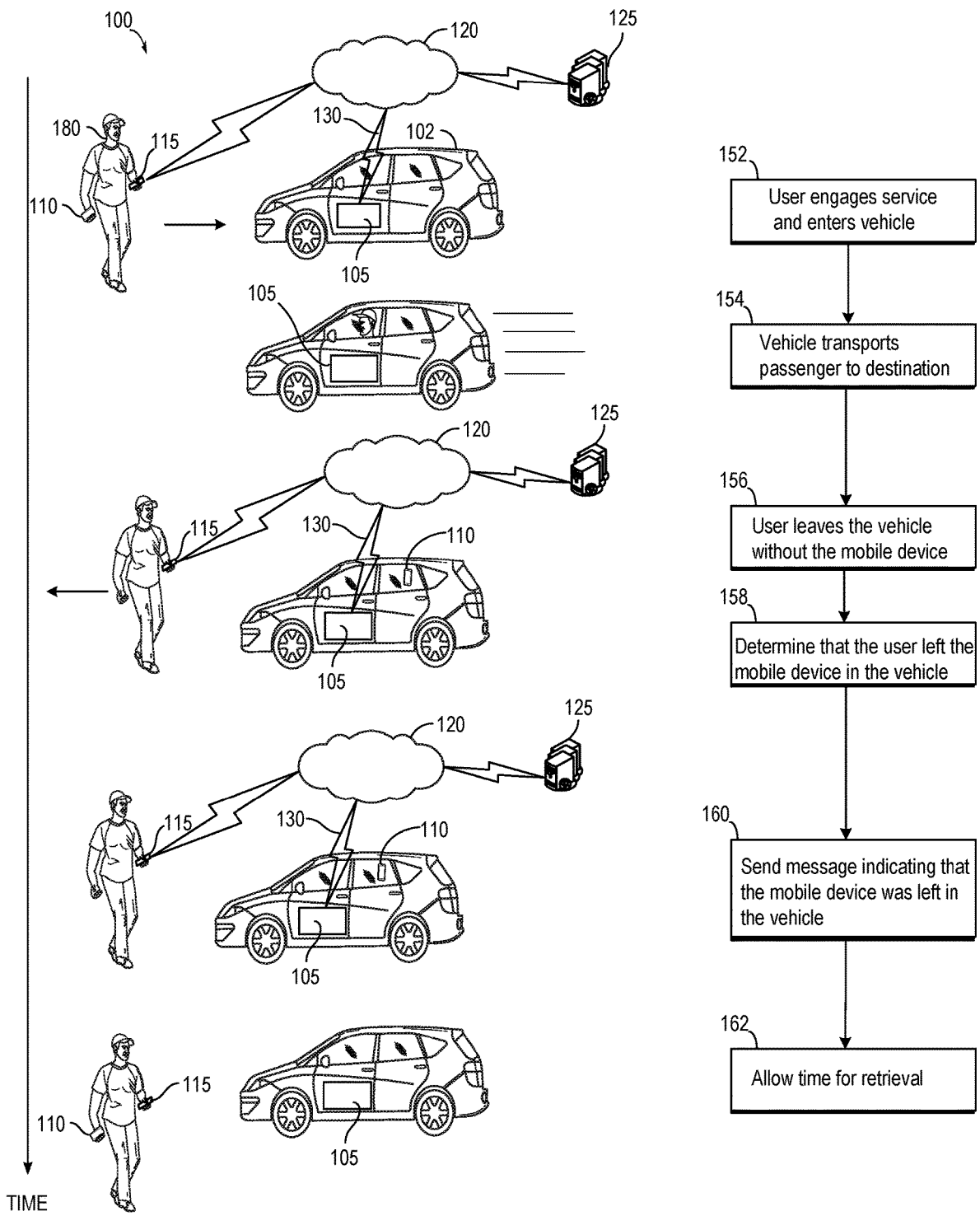
FIG. 1 is an example process flow for a method of providing warnings to users to retrieve smart devices left in vehicles, in accordance with one or more embodiments of the disclosure.

FIG. 1 is an example process flow for a method 100 of providing warnings to users to retrieve smart devices left in vehicles, in accordance with one or more embodiments of the disclosure.

At block 152, a user 180 may engage transportation services using a vehicle 102. The vehicle 102 may include an autonomous vehicle, semi-autonomous vehicle, or any other type of vehicle. The user 180 may engage a transportation service by requesting a ride using an application installed on mobile device 110. The mobile device 110 may include a smartphone, a tablet, a laptop, a wearable device, or the like. In some embodiments, the application of the mobile device 110 may send the request for the ride to controller 105 associated with the vehicle 102. The controller 105 may be a computer-based device that controls any number of functions associated with the vehicle 102, including communications with third party devices, such as the mobile device 110. In other embodiments, the application of the mobile device 110 may send a request to a service operating on a server 125, and the service of the server 125 may send the request to the controller 105 of the vehicle 102. In response to receiving the request, the controller 105 may unlock doors of the vehicle 102, so that the user 180 may get inside the vehicle and begin the ride. The user 180 may use the application installed on the mobile device 110 to indicate a destination for a ride so that the vehicle 102 may determine a route.

The user 180 may be wearing or otherwise be operatively connected to a computer-based wearable device 115. The wearable device may include a smart watch, smart glasses, a fob, and the like. The wearable device 115 can be coupled with the mobile device 110 via a wireless communication using one or more of the mobile applications of the mobile device 110 and wearable device 115. Using the mobile applications, the mobile device 110 may request and receive information from the wearable device 115. The information may include movement data associated with movement detected by the wearable device 115 and/or the mobile device 110, such as speed, direction, acceleration, number of steps taken by the user 180, distance walked by the user 180, and the like. The wearable device 115 may collect and/or generate this information using one or more motion sensors, such as accelerometers and gyroscopes, as well as other sensors/systems such as positioning systems, cameras, and the like. The wearable device 115 and/or mobile device 110 may further include an application (e.g., software) to process raw motion data from the motion sensors to generate a number of steps, speed, distance, and the like.

Similarly, the mobile device 110 may include one or more motion sensors, such as accelerometers and gyroscopes, as well as other sensors/systems such as positioning systems, cameras, and the like. The mobile device 110 may include an application (e.g., software) to process the raw data from the motion sensors to generate a number of steps, speed, distance, and so forth. It should be noted that when the user 180 holds the mobile device 110 by a hand, in a pocket of clothing, or in a handbag, the movement data obtained with the motion sensors of the mobile device 110 and the movement data obtained with the motions sensors of the wearable device 115 may be substantially similar. However, if user 180 leaves the mobile device 110 in the vehicle 102 and walks away, the movement data of the mobile device 110 may no longer match the movement data of the wearable device 115. For example, the motion data collected by the mobile device 110 and the motion data collected by the wearable device 115 may not match (e.g., may not be exact or may not be within a given threshold value of one another). Such may be an indication that one device is moving with the user 180 and the other has been left in the vehicle.

At block 154, the vehicle 102 may drive the user 180 to the destination, as specified in the request. Once the user 180 is in the vehicle, the controller 105 may synchronize with the mobile device 110 and/or the wearable device 115 using one or more pre-installed applications. The synchronization can be carried out using a wireless communication, such as WiFi™ direct, Bluetooth™, nearfield commination (NFC), and so forth. After synchronization completes, the controller 105 may exchange data with the mobile device 110 and/or wearable device 115. For example, the controller 105 may send, per request, data regarding speed of the vehicle 102, status of closing and opening doors of the vehicle 102 (e.g., as measured by vehicle sensors), current location, for example current global positioning system (GPS) coordinates of the vehicle 102 to the mobile device 110 and/or wearable device 115. The mobile device 110 or the wearable device 115 may send, per request from the controller 105 or the mobile device 110 or the wearable device 115, movement data and location data, for example, GPS coordinates associated with the mobile device 110. Similarly, the wearable device 115 may send, per request from the controller 105, movement data and location data, for example GPS coordinates associated with the wearable device 115.

At block 156 user may leave the vehicle 102 upon arrival at the destination. The controller 105 may then send to an application located on a server 125 in the computing cloud 120, via a wireless communication 130, a message indicating that the ride has ended and indicating that user 180 has left the vehicle. The user's departure may be indicated by the detection of a door being unlocked, a door opening, a seat pressure sensor detecting the removal of weight, etc., as may be determined by the controller 105. After the user 180 has the left the vehicle 102, the controller 105 may close and lock the doors of the vehicle 102. However, it may be possible that the user 180 has accidently left the mobile device 110 in the vehicle 102.

At block 158, it may be determined that the user 180 departed the vehicle 102 and left the mobile device 110 in the vehicle. The determination that the mobile device 110 is left in the vehicle 102 can be carried out using either the controller 105, the mobile device 110, the wearable device 115, and/or an application executing on the server 125.

According to some example embodiments, the wearable device 115 may receive, from the controller 105, an indication that the user 180 left the vehicle 102. For example, the controller 105 may send notification that vehicle 102 came to a complete stop, and a door of the vehicle was unlocked, opened, and then closed. The mobile device 110, upon receiving such indication, may request movement data from the wearable device 115. The mobile device 110 may compare the movement data (acceleration, speed, number of steps, or distance) from the wearable device 115 with the movement data obtained using sensors of the mobile device 110. For example, the mobile device 110 may compare number of steps recorded during a pre-determined time period, for example a pre-determined number of seconds past since receiving indication that the user 180 left the vehicle 102. If a movement (e.g., number of steps) detected by the mobile device 110 is not similar to that of the wearable device 115, for instance, within a threshold of each other, then it may be determined that the mobile device 110 was left in the vehicle 102. For instance, if the wearable device 115 provides the mobile device with an indication that four steps have been taken by the user but the mobile device 110 determines no steps have been taken, then it may be determined that the mobile device 110 was left in the vehicle 102. Similarly, if a walking distance recorded with the mobile device 110 is unchanged and a walking distance recorded with the wearable device 115 is changed then it is determined that the mobile device 110 is left in the vehicle 102 while the user 180 is walking away from the vehicle 102. The mobile device 110 may also compare GPS coordinates and acceleration data recorded with sensors associated with the mobile device 110 and sensors of the wearable device 115.

In some embodiments, the determination that the mobile device 110 is left in the vehicle can be carried out by the mobile device 110, as described above, or by the wearable device 115, the controller 105, or the server 125. For example, the retrieval and comparison of the movement may be performed by the mobile device 110, as described above, or by the wearable device 115, or by the server 125, and that device or another may initiate alerts and manage a device retrieval process.

For instance, in an embodiment, the wearable device 115 may receive an indication from the controller 105 that the user 180 left the vehicle. The wearable device 115 may further request the movement data and/or location data from the mobile device 110 recorded during a pre-determined time period since receiving the indication from the controller 105. The wearable device 115 may further compare the movement data and/or location data from the mobile device 110 and the compare the movement data and/or location data from the wearable device 115. If the movement data from the mobile device 110 does not match the motion data from the wearable device 115, for example, within a threshold, then it may determine that the user 180 left the mobile device 110 in the vehicle. The wearable device 115 may further send a message to the controller 105 indicating that the mobile device 110 was left in the vehicle 102. The message may also include a distance of the user 180 from the vehicle 102, for example, the number of steps the user walked away from the vehicle 102.

In some embodiments, the wearable device 115 or the mobile device 110 may request movement data and location data of vehicle 102 from the controller 105. The wearable device 115 may compare movement data and/or location data from the wearable device 115 with both movement data and/or location data from the wearable device 115 and movement data and/or location data of vehicle 102 from the controller 105. For example, if the wearable device 115 does not receive movement and location data from the mobile device 110 (or vice versa), or the wearable device 115 may supplement the movement and location data from the mobile device 110 (or vice versa), then the controller 105 may provide such data for analysis.

In some other embodiments, after determining that the user 180 left the vehicle 102, the controller 105 may request last movement data and/or location data from the mobile device 110 and the wearable device 115. The controller 105 may further compare changes in the movement data and/or location data from the mobile device 110 and the wearable device 115. If the changes in the movement data and/or location data from the mobile device 110 and the wearable device 115 differs, then the controller 105 may determine that the mobile device 110 was left in the vehicle 102. The controller 105 may also compare changes in movement data from the mobile device 110 and movement data of vehicle 102. The controller 105 may use motion data and/or location data from the wearable device 115 to estimate a distance that the user 180 walked away from the vehicle 102.

At block 160, the mobile device 110 may generate and send message to wearable device 115 and/or to the controller 105 indicating that the mobile device 110 was left in the vehicle 102. The messages may also indicate a distance that user 180 walked away from the vehicle 102. The messages may further include an amount of time given to the user 180 to retrieve the mobile device 110 from the vehicle 102.

Upon receiving the message indicating that the mobile device 110 was left in vehicle 102 or determining that the mobile device 110 was left in the vehicle 102, the wearable device 115 may be configured to alert the user 180 using a vibration and/or sound, or some other indication. If the wearable device 115 includes a graphical display system, the wearable device 115 may be configured to display a warning message and a timer showing amount of time (for example number minutes or seconds) given to the user 180 to return to the vehicle 102 and retrieve the mobile device 110. For example, it may take five seconds to determine that user 180 walks away from the vehicle 102 without the mobile device 110. The message to the wearable device 115 may include, for example, "You left your device in the vehicle and you will have fifteen seconds from now to go back and take it," or something similar.

At block 162, upon receiving the message indicating that the wearable device 110 was left in vehicle 102 or determining that the wearable device 110 was left in the vehicle 102, the controller 105 may monitor movement data and location data received from the wearable device 115 to determine distance of the wearable device 115 (and hence, user 180) from the vehicle 102. The controller may unlock the doors of the vehicle 102 only when the coordinates wearable device 115 match substantially the coordinates of the vehicle 102 (e.g., when the wearable device 115 is within a threshold distance of the vehicle 102). In addition, the controller 105 may unlock the doors of the vehicle 102 only if the time allotted to the user 180 to retrieve the mobile device 110 has not expired. The time can be estimated based on distance between the vehicle 102 and the user 180. In some embodiments, the time to retrieve the mobile device 110 may be fixed at a pre-determined value. The controller 105 may also determine that user 180 going back to the vehicle 102 and the time allocated to user 180 to retrieve the mobile device 110 has almost expired. In this situation, the controller 105 may extend the time given to retrieve the mobile device 110 to give the user 180 one more chance to retrieve it.

In some embodiments, the steps 158-162 can be undertaken only if the charge of batteries of the wearable device 115 and the mobile device 110 are more than a threshold batter capacity (e.g., 15% of battery capacity).

In some embodiments, if the user 180 fails or forgets to retrieve the mobile device 110 from the vehicle 102, the controller 105 may send a message to the driving application at server 125 indicating that the user 180 left the mobile device in vehicle 102. The driving application may store the indication in a database. When a next user requests transportation service with the vehicle 102, the driving application may send the message to the next user indicating that user 180 left the mobile device 110 in vehicle 102. The message may also allow the next user to select from two options: 1) to leave the mobile device 110 inside the vehicle 102; or 2) take the mobile device 110 and return it to the user 180. In addition, the vehicle 102 may include one or more cameras to monitor interior of the vehicle 102 to prevent other users from taking the mobile device 110 undetected.

Figure 2:
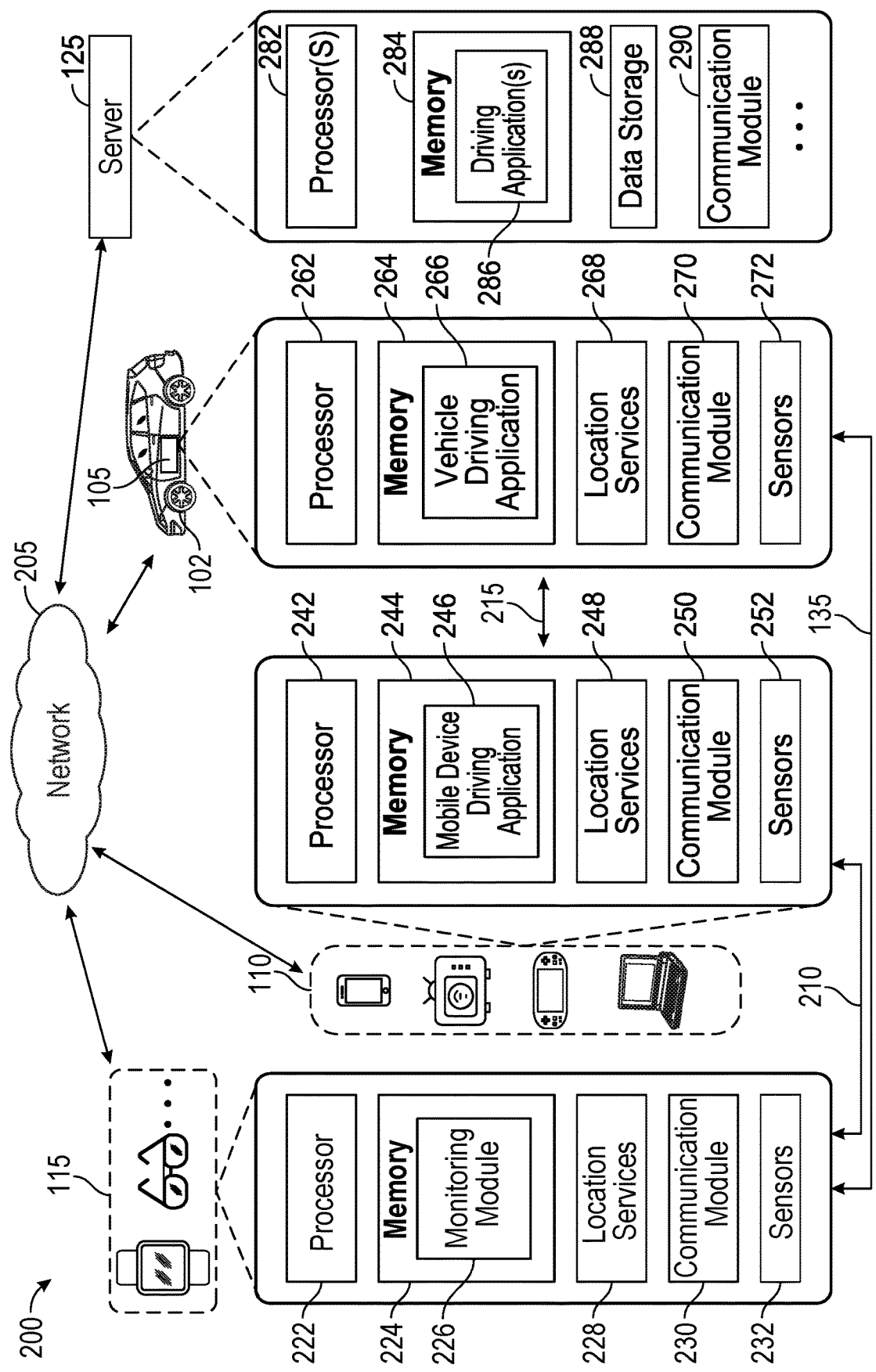
FIG. 2 is a block diagram of an example computer architecture, in accordance with one or more embodiments of the disclosure.

FIG. 2 is a schematic illustration of an example architecture 200 for one or more wearable device(s) 115, one or more mobile device(s) 110, one or more vehicle(s) 102, and one or more server(s) 125 in accordance with one or more embodiments of the disclosure.

The server 125 illustrated in the example of FIG. 1 may correspond to a computer system configured to implement the functionality discussed with respect to FIG. 1. Some or all of the individual components may be optional and/or different in various embodiments. The server 125 may be in communication with the controller 105 of the vehicle 102, and one or more mobile device(s) 110, one or more wearable device(s) 115 via a network 205. The controller 105 of the vehicle 102 may be in wireless communication 215 with the mobile device 110 and in wireless communication 135 with the wearable device 115. The wearable device 115 may be in wireless communication 210 with the mobile device 110. The wireless communications 210, 215, and 135 may include wireless protocols such as WiFi™ direct, Bluetooth™, NFC, and the like.

The network 205 may include, but is not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The server 125 may include one or more processors (processor(s)) 282, one or more memory devices 284 (also referred to herein as memory 284), one or more communication module(s) 290, and data storage 288. The server 125 may also include one or more input/output (I/O) interface(s), one or more sensor(s) or sensor interface(s), one or more transceiver(s), one or more optional display components, one or more optional camera(s)/microphone(s). The server 125 may include one or more bus(es) that functionally couple various components of the server 125. The server 125 may further include one or more antenna(e) that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

Components may be connected by one or more buses (not shown). The bus(es) may include at least one of a system bus, a memory bus, an address bus, or a message bus, and may permit the exchange of information (e.g., data (including computer-executable code), signaling, etc.) between various components of the server 125. The bus(es) may include, without limitation, a memory bus or a memory controller, a peripheral bus, an accelerated graphics port, and so forth. The bus(es) may be associated with any suitable bus architecture.

The memory 284 of the server 125 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

The data storage 288 may include removable storage and/or non-removable storage including, but not limited to, magnetic storage, optical disk storage, and/or tape storage. The data storage 288 may provide non-volatile storage of computer-executable instructions and other data.

The data storage 288 may store computer-executable code, instructions, or the like that may be loadable into the memory 284 and executable by the processor(s) 282 to cause the processor(s) 282 to perform or initiate various operations. The data storage 288 may additionally store data that may be copied to the memory 284 for use by the processor(s) 282 during the execution of the computer-executable instructions. More specifically, the data storage may store one or more operating systems (O/S); one or more database management systems (DBMS); and one or more program module(s), applications, engines, computer-executable code, scripts, or the like such as, for example, one or more driving application(s) 286. Some or all of these module(s) may be sub-module(s). Any of the components depicted as being stored in the data storage 288 may include any combination of software, firmware, and/or hardware. The software and/or firmware may include computer-executable code, instructions, or the like that may be loaded into the memory 284 for execution by one or more of the processor(s) 282. Any of the components depicted as being stored in the data storage 288 may support functionality described in reference to corresponding components named earlier in this disclosure.

The processor(s) 282 may be configured to access the memory 284 and execute the computer-executable instructions loaded therein. For example, the processor(s) 282 may be configured to execute the computer-executable instructions of the various program module(s), applications, engines, or the like of the server 125 to cause or facilitate various operations to be performed in accordance with one or more embodiments of the disclosure. The processor(s) 282 may include any suitable processing unit capable of accepting data as input, processing the input data in accordance with stored computer-executable instructions, and generating output data. The processor(s) 282 may include any type of suitable processing unit.

The driving application(s) 286 may include computer-executable instructions, code, or the like that responsive to execution by one or more of the processor(s) 282 may perform functions including, but not limited to, sending and/or receiving data, determining whether a user has left or entered a vehicle, determining whether an vehicle should wait for a user, determining whether a user is in proximity to a vehicle, and the like.

The driving application(s) 286 may be in communication with the vehicle 102, mobile device 110, and/or other components. For example, the driving application(s) 286 may send traffic data or ride requests to the vehicle 102, receive road condition data from third party servers, receive user selections of route preferences from the mobile device 110, provide messages to the mobile device 110, and so forth.

The data storage 288 may include a database for storing information regarding vehicles, trips, users, and so forth. The database may use any of a variety of database models (e.g., relational model, object model, etc.) and may support any of a variety of query languages.

The communication module 290 may include one or more network interface(s) via which the server 125 may communicate with any of a variety of other systems, platforms, networks, devices, and so forth. The network interface(s) may enable communication, for example, with one or more wireless routers, one or more host servers, one or more web servers, and the like via one or more networks.

It should further be appreciated that the server 125 may include alternate and/or additional hardware, software, or firmware components beyond those described or depicted without departing from the scope of the disclosure.

The mobile device 110 may include one or more computer processor(s) 242, one or more memory devices 244 (also referred as memory), and one or more applications, such as mobile device driving application 246, location services 248, communication module 250, and sensors 252. Other embodiments may include different components. The applications may include executable instructions to cause autonomous vehicle driving (e.g., mobile driving application 246).

The processor(s) 242 may be configured to access the memory 244 and execute the computer-executable instructions loaded therein. For example, the processor(s) 242 may be configured to execute the computer-executable instructions of the various program module(s), applications, engines, or the like of the device to cause or facilitate various operations to be performed in accordance with one or more embodiments of the disclosure. The processor(s) 242 may include any suitable processing unit capable of accepting data as input, processing the input data in accordance with stored computer-executable instructions, and generating output data. The processor(s) 242 may include any type of suitable processing unit.

The memory 244 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

Referring now to functionality supported by the mobile device 110, the mobile device driving application 246 may be a mobile application executable by the processor 242 that can be used to present options and/or receive user inputs of information related to vehicle ride requests, determine if the mobile device 110 has been left by the user 180 in the vehicle, and sending a warning to the wearable device 115 indicating such, and so forth.

The mobile device 110 may include location services 248, for example a GPS module, to determine location of the mobile device 110. The mobile device 110 may include sensors 252, such as proximity sensor, accelerometer, gyroscopes, and so forth. The mobile device 110 may further include communication module 250 to communicate with the wearable device 115, vehicle 102, and server 125 via one or more wireless network protocols.

The controller 105 of the vehicle 102 may include one or more computer processor(s) 262, one or more memory devices 264, one or more sensors 272, and one or more applications, such as a vehicle driving application 266, location services 268, and communication module 270. Other embodiments may include different components.

The processor(s) 262 may be configured to access the memory 264 and execute the computer-executable instructions loaded therein. For example, the processor(s) 262 may be configured to execute the computer-executable instructions of the various program module(s), applications, engines, or the like of the device to cause or facilitate various operations to be performed in accordance with one or more embodiments of the disclosure. The processor(s) 262 may include any suitable processing unit capable of accepting data as input, processing the input data in accordance with stored computer-executable instructions, and generating output data. The processor(s) 262 may include any type of suitable processing unit.

The memory 264 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

The location services 268 may include a GPS module, to determine location of the vehicle 102. The sensors 272 may include proximity sensors, accelerometers, gyroscopes, and so forth. The controller 105 may further include communication module 270 to communicate with the wearable device 115, mobile device 110, and server 125 via one or more wireless network protocol.

Referring now to functionality supported by the vehicle 102, the vehicle driving application 266 may be a mobile application executable by the processor 262 that can be used to receive and process data from the sensors 272, receive and execute data form the wearable device 115 and the mobile device 110, and/or control operation of the autonomous vehicle 102.

The wearable device 115 may include one or more computer processor(s) 222, one or more memory devices 224 (also referred as memory), one or more applications, such as monitoring module 226, locations services 228, communication module 230, and sensors 232. Other embodiments may include different components.

The processor(s) 222 may be configured to access the memory 224 and execute the computer-executable instructions loaded therein. For example, the processor(s) 222 may be configured to execute the computer-executable instructions of the various program module(s), applications, engines, or the like of the device to cause or facilitate various operations to be performed in accordance with one or more embodiments of the disclosure. The processor(s) 222 may include any suitable processing unit capable of accepting data as input, processing the input data in accordance with stored computer-executable instructions, and generating output data. The processor(s) 222 may include any type of suitable processing unit.

The memory 224 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

The wearable device 115 may include location services 228, for example a GPS module, to determine location of the wearable device 115. The wearable device 115 may include sensors 232, such as proximity sensor, accelerometers, gyroscopes, and so forth. The wearable device 115 may further include communication module 230 to communicate with the mobile device 110, the vehicle 102, and the server 125 via one or more wireless network protocol. The wearable device 115 may further include a touchscreen or graphical display system, a speaker, and a vibration device.

Referring now to functionality supported by the wearable device 115, the monitoring module 226 may be a mobile application executable by the processor 222 that can be used to present options and/or receive user inputs of information related to vehicle ride requests, determine if the mobile device 110 is left by the user 180 in the vehicle, receive messages from mobile device 110 or controller 105 indicative that the mobile device 110 is left in the vehicle 102, and provide warnings to the user using vibrations, sound, or displaying a text message using a graphical display system, and so forth.

One or more operations of the methods, process flows, and use cases of FIG. 1 and FIGS. 3-6 may be performed by a device having the illustrative configuration depicted in FIG. 2, or more specifically, by one or more processors, program module(s), applications, or the like executable on such a device. It should be appreciated, however, that such operations may be implemented in connection with numerous other device configurations.

The operations described and depicted in the illustrative methods and process flows of FIG. 1 and FIGS. 3-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1, and 3-6 may be performed.

Figure 3:
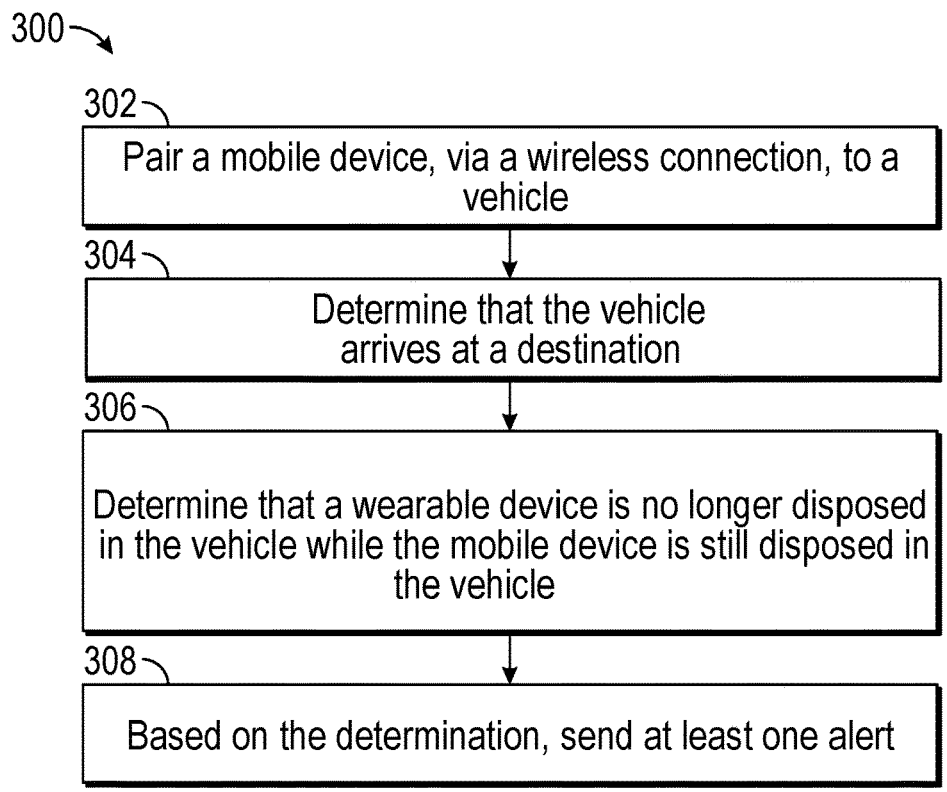
FIG. 3 is an example process flow for a method of providing warnings to users to retrieve a smart device left in a vehicle, in accordance with one or more embodiments of the disclosure.

FIG. 3 is an example process flow 300 for a method of providing warnings to users to retrieve smart devices left in vehicles in accordance with one or more embodiments of the disclosure. The process flow 300 may be implemented using wearable device 115 and other devices of architecture 200 depicted in FIG. 2. For example, the steps of the process flow can be executed by one or more processor(s) of the mobile device 110 or one or more processor(s) of the controller 105.

At block 302 of the process flow 300, the one or more processor(s) may execute computer-executable instructions stored on memory to pair the mobile device 110 to a controller 105 of the vehicle 102. For example, the one or more processor(s) of the wearable device 110 may send a request for transportation service to computing cloud 120 or server 125. The one or more processor(s) of the computing cloud 120 or the server 125 may send the request to controller 105 of the vehicle 102. The request may include GPS coordinates of the mobile device 110, medium access control (MAC) or other address of the mobile device 110, user identification of the user 180 of the mobile device 110, and a destination. Upon receiving the request, the controller 105 may establish a wireless communication with the mobile device 110 using information indicated in the request. The controller 105 may unlock doors of the vehicle 102 to allow the user 180 to get into the vehicle to start a ride to the destination. During the ride, the controller 105 and the mobile device 110 may exchange data via the wireless communication. User may wear wearable device 115 paired with the mobile device 110 via wireless communication.

At block 304 of the process flow 300, one or more processor(s) may execute computer-executable instructions stored on memory to determine that the vehicle arrived at a destination. The one or more processor(s) may determine current GPS coordinates of the mobile device 110 using sensors of the mobile device 110 and compare the current GPS coordinates to the GPS coordinates of the destination. The one or more processor(s) may also receive an indication from the sensors of the vehicle 102 that the vehicle 102 came to a complete stop. Determining that the vehicle 102 has arrived may be based on a predetermined route (e.g., based on a user's input using the mobile device 110 to indicate an arrival destination), determining that the user has departed the vehicle 102 (e.g., based on door sensor data), or that the user has provided an input (e.g., via the mobile device 110) that the ride has ended.

At block 306 of the process flow 300, one or more processor(s) may execute computer-executable instructions stored on memory to determine that the wearable device 115 is no longer disposed in the vehicle 102 while the mobile device 110 is still disposed in the vehicle 102. The determination can be based on comparison of movement data and location provided by sensors of the wearable device 115 and movement data and location provided by sensors of the mobile device 110. If movement data associated with the mobile device 110 and with the wearable device 115 are not the same or within a threshold difference, then it may be determined that at least one of the mobile device 110 and the wearable device 115 departed the vehicle 102 while the other was left in the vehicle 102. For example, motion indicating that one of the devices has moved a particular amount (e.g., distance, steps, etc.) since the ride was indicated as having finished, but the other device's motion data indicates that the respective device may still be in the vehicle 102, then the discrepancy may indicate that a device was left in the vehicle 102. Example process flow depicting details of the block 304 is shown in FIG. 4.

At block 308 of the process flow 300, one or more processor(s) may execute computer-executable instructions stored on memory to send, based on the determination, at least one alert concerning the wearable device 115 or the mobile device 110. The alert may include a message or some other indication that the wearable device 115 or mobile device 110 was left in the vehicle 102 and time allocated to the user 180 to retrieve the mobile device 110 or the wearable device 115 from the vehicle 102. The alert may also prompt the user 180 to respond with an indication that the user 180 intends to retrieve the wearable device 115 or the mobile device 110 within the allocated time.

Figure 4:
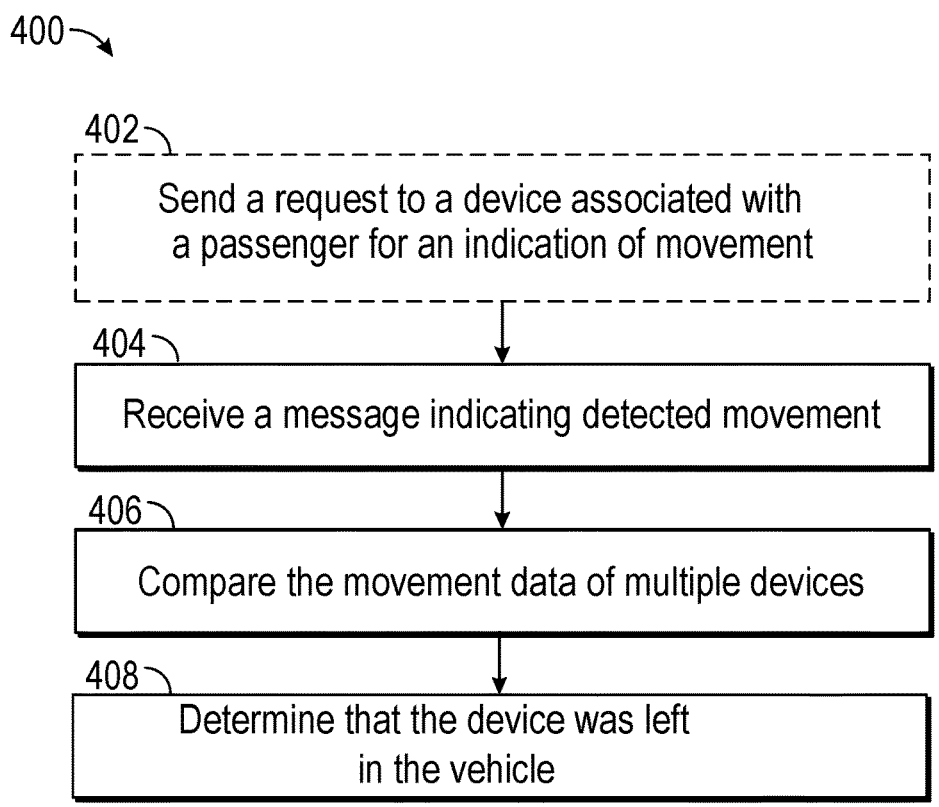
FIG. 4 is an example process flow for a method of determining that a smart device is left in a vehicle, in accordance with one or more embodiments of the disclosure.

FIG. 4 is an example process flow 400 for a method of determining that the wearable device is left in a vehicle in accordance with one or more embodiments of the disclosure. The process flow 400 may be implemented using wearable device 115 and other devices of architecture 200 depicted in FIG. 2 For example, the steps of the process flow 400 can be executed by one or more processor(s) of the mobile device 110, or one or more processor(s) of the controller 105.

At block 402 of the process flow 400, the one or more processor(s) may execute computer-executable instructions stored on memory to send a request to a wearable device 115 or the mobile device 110 associated with the user 180 for detected movement associated with the wearable device 115 or the mobile device 110.

At block 404 of the process flow 400, the one or more processor(s) may execute computer-executable instructions stored on memory to receive a message indicating detected movement associated with the wearable device 115 or the mobile device 110. For example, the message may include an indication of a number of steps detected by the wearable device 115 or the mobile device 110 during a pre-determined time period after the vehicle 102 comes to a complete stop or after a door of the vehicle 102 was open and closed. The indication that the vehicle 102 comes to a complete stop or after a door of the vehicle 102 was open and closed can be determined based on information provided by one or more sensors of the vehicle 102 (e.g., that doors opened and closed), based on a user's input indicating that a ride has ended, or based on a determination that the vehicle 102 has reached a predetermined destination (e.g., based on a user input provided by the mobile device 110).

At block 406 of the process flow 400, the one or more processor(s) may execute computer-executable instructions stored on a memory to compare the movement data collected by multiple devices (e.g., the mobile device 110, the wearable device 115, and/or the controller 105). The movement data may indicate that one or more of the devices have been associated with movement since a ride ended, but that one of the devices may not be associated with the same or similar movement. For example, if the movement data associated with the mobile device 110 indicates that the mobile device 110 has not moved from the vehicle 102 after a ride has ended, but the movement data associated with the wearable device 115 indicates that the wearable device 115 has moved from the vehicle 102 since a ride ended, then such may indicate that the mobile device 110 has been left in the vehicle 102.

At block 408 of the process 400, the one or more processor(s) may execute computer-executable instructions stored on a memory to determine that the wearable device 115 or the mobile device 110 was left in the vehicle 102. In some embodiments, a change in GPS coordinates of the wearable device 115 and change in GPS coordinates of the wearable device 115 can be compared to determine that the wearable device 115 was left in the vehicle. In some embodiments, a detected change in distance or number of steps walked by the user with the wearable device 115 can be compared to a change in in distance or number of steps detected by the mobile device 110 to determine that the mobile device 110 was left in the vehicle 102 or vice versa.

Figure 5:
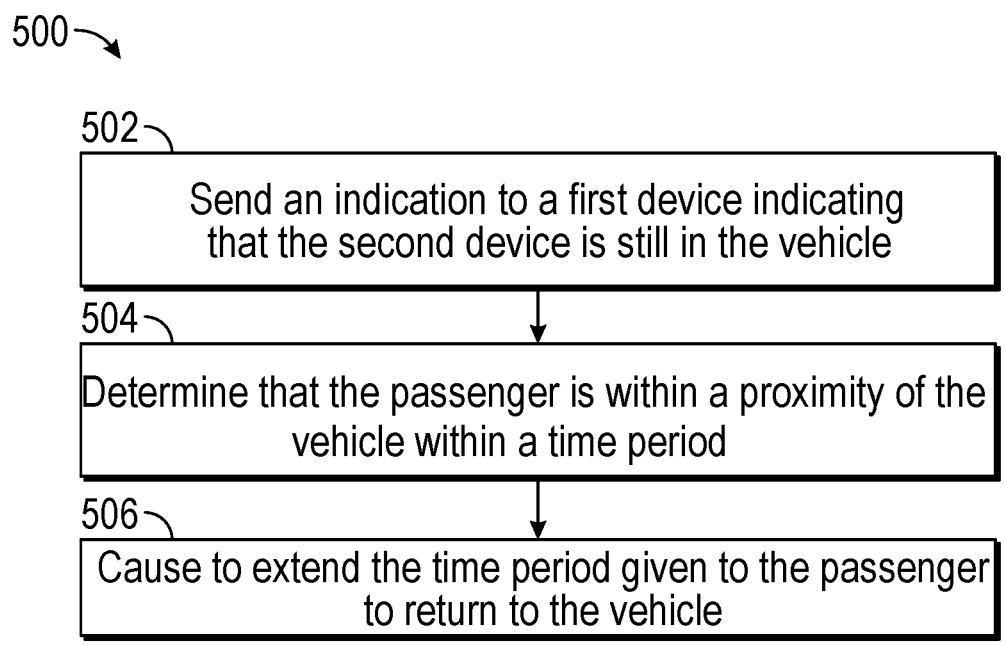
FIG. 5 is an example process flow for a method of detecting that smart devices were left in a vehicle and facilitating retrieval of the devices, in accordance with one or more embodiments of the disclosure.

FIG. 5 is an example process flow 500 for a method of detecting that smart devices were left in a vehicle and facilitating retrieval of the devices, in accordance with one or more embodiments of the disclosure. The process flow 500 may be implemented using wearable device 110 and other devices of architecture 200 depicted in FIG. 2. For example, the steps of the process flow 500 can be executed by one or more processor(s) of the mobile device 110, or one or more processor(s) of the controller 105. The process flow 500 may be a continuation of the process flow 400 shown in FIG. 5.

At block 502 of the process flow 500, the one or more processor(s) may execute computer-executable instructions stored on memory to send an indication to the wearable device 115 or the mobile device 110 indicating that the mobile device 110 or the wearable device 115 is still in the vehicle 102. The indication may also include a time period allocated to the user 180 to retrieve the mobile device 110 or the wearable device 115 from the vehicle 102. The wearable device 115 or the mobile device 110 may alert the user 180 by one or more of the following: displaying or otherwise providing a message or other indication that the wearable device 115 or the mobile device 110 was left in the vehicle 102 and the time period to retrieve the mobile device.

At block 504 of the process flow 500, the one or more processor(s) may execute computer-executable instructions stored on memory to determine that the user 180 is within proximity of the vehicle 102 within the time period given to the passenger to return to the vehicle. The determination that user 180 is within the proximity of the vehicle 102 can be performed based on the GPS coordinates of the wearable device 115 or the mobile device 110, and GPS coordinates of the vehicle 102. The one or more processors may request the GPS coordinates of the wearable device 115 via a wireless communication after sending the indication that the mobile device 110 is left in vehicle 102. The one or more processors may further compare GPS coordinates of the wearable device 115 or the mobile device 110 and the GPS coordinates of the vehicle 102 to determine the distance between the wearable device 115 or the mobile device 110 and the vehicle 102.

At block 506 of the process flow 500, the one or more processor(s) may execute computer-executable instructions stored on memory to cause to extend the time period given to the user 180 to return to the vehicle 102. For example, if the user 180 is within a distance threshold of the vehicle 102 and the time period is nearing expiration (e.g., within a threshold time of the expiration of the time period), then the time period may be extended to allow the user 180 to retrieve the mobile device 110. The one or more processors may cause to send an indication of the time extension to the wearable device 110 or to another device to indicate to the passenger that the retrieval time has been extended. It should be noted, that doors of the vehicle may remain closed and locked until it is determined that the user 180 of the wearable device 115 reaches the vehicle 102.

Figure 6:
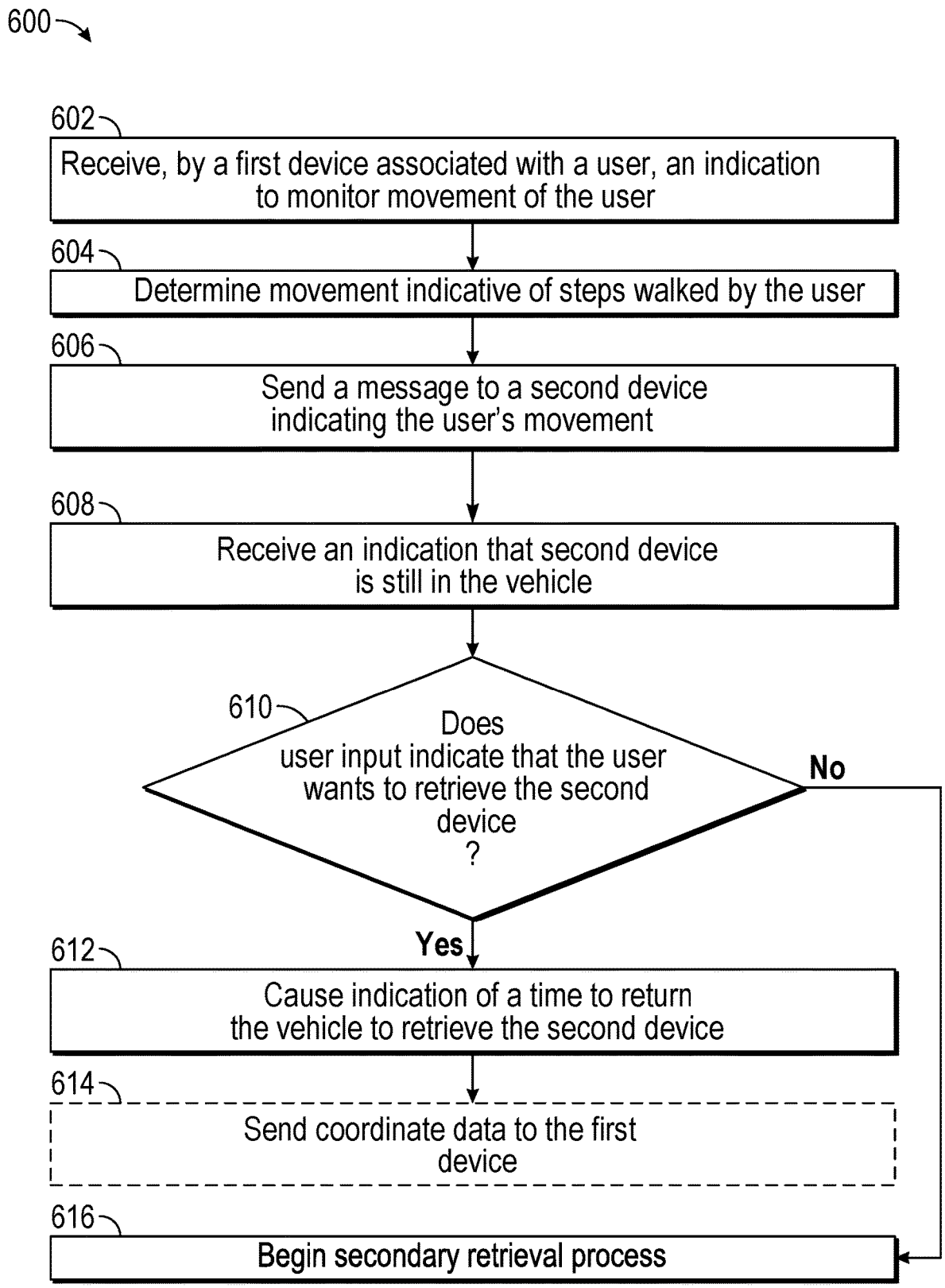
FIG. 6 is an example process flow for a method of providing warnings to users to retrieve smart devices left in vehicles in accordance with one or more embodiments of the disclosure.

FIG. 6 is an example process flow 600 for a method of providing warnings to users to retrieve smart devices left in vehicles in accordance with one or more embodiments of the disclosure. The process flow 600 may be implemented using wearable device 115 and/or other devices of architecture 200 depicted in FIG. 2. Specifically, the steps of the process flow 600 can be executed by one or more processor(s) of the mobile device 110.

At block 602 of the process flow 600, the one or more processor(s) of the wearable device 115 or the mobile device 110 may execute computer-executable instructions stored on memory to receive an indication to monitor movement associated with the wearable device 115 or the mobile device 110. The movement data may include location, steps walked, or the like.

At block 604 of the process flow 600, the one or more processor(s) of the wearable device 115 may execute computer-executable instructions stored on memory to determine, by the wearable device 115 or the mobile device 110, movement indicative of steps walked or run by the user 180.

At block 606 of the process flow 600, the one or more processor(s) of the wearable device 115 or the mobile device 110 may execute computer-executable instructions stored on memory to send a message to the other respective device, and the message may indicate a distance or number of steps which have been walked or run by the user 180. The message may include a distance or number of steps detected by the wearable device 115 during a time period. The message may include distance walked or run by the user 180 of the wearable device 115 during a time period.

At block 608 of the process flow 600, the one or more processor(s) of the wearable device 115 or the mobile device 110 may execute computer-executable instructions stored on memory to identify a received message indicating that the wearable device 115 or the mobile device 110 is still in the vehicle 102. The message may be received and presented (e.g., on a display) by the wearable device 115 or the mobile device 110. The message may be a user input indicating that the user 180 left the wearable device 115 or the mobile device 110 in the vehicle 102. The wearable device 115 or the mobile device 110 may prompt the user 180 to indicate whether the user 180 will retrieve the wearable device 115 or the mobile device 110 within an allocated time period.

At decision block 610 of the process flow 600, the one or more processor(s) of the wearable device 115 or the mobile device 110 may execute computer-executable instructions stored on memory to receive a user input and determine if the user input indicates that the user 180 wants to retrieve the wearable device 115 or the mobile device 110. The user input may be received in response to the prompt asking the user 180 to indicate whether the user 180 intends to retrieve the wearable device 115 or the mobile device 110. If the user input indicates that the user 180 wants to retrieve the wearable device 115 or the mobile device 110, the process flow 600 proceeds further to block 612. If the user input indicates that user 180 does not want to retrieve the mobile device 110 or the wearable device 115, the process flow 600 proceeds further to block 616.

At block 612 of the process flow 600, the one or more processor(s) of the wearable device 115 or the mobile device 110 may execute computer-executable instructions stored on memory to cause the controller 105 to preset a time for the user to return to the vehicle to retrieve the wearable device 115 or the mobile device 110. For example, the one or more processor(s) of the wearable device 115 or the mobile device 110 may send a message to controller 105 to set the time to retrieve the mobile device 110 or the wearable device 115.

At optional block 614 of the process flow 600, the one or more processor(s) of the wearable device 115 may execute computer-executable instructions stored on memory to send coordinate data to the mobile device 110 or the controller 105.

At block 616 of the process flow 600, the one or more processor(s) of the wearable device 115 or the mobile device 110 may execute computer-executable instructions stored on memory to stop retrieving the mobile device 110 or the wearable device 115 at this time and instead begin a secondary retrieval process. For example, a secondary retrieval process may include providing an alternative later time period when the user 180 may retrieve the wearable device 115 or the mobile device 110, either from the vehicle 102 or at another location. The secondary retrieval process may include the controller 105 prompting another device associated with a subsequent passenger with one or more options to facilitate returning the wearable device 115 or the mobile device 110 to the user 180. The options for subsequent passengers may include sending one or more indications to a subsequent passenger's device including a meeting location where the subsequent may return the wearable device 115 or the mobile device 110 to the user 180 at a particular time, an option to store the wearable device 115 or the mobile device 110 in a compartment in the vehicle 102, and a location where the subsequent passenger may take the wearable device 115 or the mobile device 110. If the subsequent passenger selects an option to return the wearable device 115 or the mobile device 110 to the user 180, the user 180 may be prompted (e.g., via the wearable device 115 or the mobile device 110) to indicate a preferred meeting or return location, or to provide location information to allow the subsequent passenger to find the user 180.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Example 1 may include a method comprising: causing to establish, by processing circuitry of a first mobile device, a wireless communication connection with a vehicle; identifying, by the processing circuitry, an indication of an arrival of the vehicle at a destination, wherein the first mobile device and a second mobile device are disposed inside the vehicle at a first time associated with the arrival; determining, by the processing circuitry, at a second time after the first time, movement data associated with the first mobile device and the second mobile device; determining, by the processing circuitry, based at least in part on the movement data, that one of the second mobile device or the first mobile device is disposed in the vehicle and the other respective device is not disposed in the vehicle; and causing to send, by the processing circuitry, an indication to the second mobile device that one of the first mobile device or the second mobile device is disposed in the vehicle.

Example 2 may include the method of example 1 and/or some other example herein, wherein identifying the indication of the arrival comprises determining vehicle sensor data indicating a status of a door of the vehicle.

Example 3 may include the method of example 1 and/or some other example herein, wherein identifying the indication of the arrival comprises determining vehicle seat sensor data indicating that a passenger has departed the vehicle after the first time.

Example 4 may include the method of example 1 and/or some other example herein, further comprising: identifying a destination received from the first mobile device or the second mobile device; and determining location information associated with the vehicle, wherein identifying the indication of the arrival comprises determining that the vehicle has arrived at the destination based at least in part on the location information.

Example 5 may include the method of example 1 and/or some other example herein, wherein the movement data indicates a first distance between the first mobile device and the vehicle and a second distance between the second mobile device and the vehicle.

Example 6 may include the method of example 1 and/or some other example herein, wherein a user is associated with at least one of the first mobile device or the second mobile device, and wherein the movement data indicates a number of steps associated with the user.

Example 7 may include the method of example 1 and/or some other example herein, wherein the movement data indicates first location information associated with the first mobile device and second location information associated with the second mobile device.

Example 8 may include the method of example 1 and/or some other example herein, wherein the movement data indicates first movement data associated with the first mobile device and second movement data associated with the second mobile device, wherein determining that one of the second mobile device or the first mobile device is disposed in the vehicle and the other respective device is not disposed in the vehicle comprises determining that a difference between the first movement data and the second movement data exceeds a threshold amount.

Example 9 may include the method of example 1 and/or some other example herein, wherein causing to send the indication comprises causing to send a first indication of a time period associated with retrieval of the first mobile device or the second mobile device.

Example 10 may include the method of example 9 and/or some other example herein, further comprising: determining that the first mobile device or the second mobile device is within a proximity threshold of the vehicle before expiration of the time period; and unlocking a door of the vehicle.

Example 11 may include the method of example 9 and/or some other example herein, further comprising: determining that the first mobile device or the second mobile device is not within a proximity threshold of the vehicle before expiration of the time period; and causing an extension of the time period.

Example 12 may include the method of example 9 and/or some other example herein, further comprising: identifying a received indication that a user will not retrieve the first mobile device or the second mobile device from the vehicle; and causing to send an indication of a location or a time when the user may retrieve the first mobile device or the second mobile device from the vehicle.

Example 13 may include the method of example 9 and/or some other example herein, further comprising: identifying a received indication that a user will not retrieve the first mobile device or the second mobile device from the vehicle; and causing to send an instruction to a third mobile device indicating a location to leave the first mobile device or the second mobile device.

Example 14 may include the method of example 1 and/or some other example herein, wherein the second device is a wireless wearable device.

Example 15 may include a device comprising storage and processing circuitry configured to: cause to establish a wireless communication connection with a vehicle; identify an indication of an arrival of the vehicle at a destination, wherein the device and a second device are disposed inside the vehicle at a first time associated with the arrival; determine, at a second time after the first time, movement data associated with the device and the second device; determine, based at least in part on the movement data, that one of the second device or the device is disposed in the vehicle and the other respective device is not disposed in the vehicle; and cause to send an indication to the second device that one of the device or the second device is disposed in the vehicle.

Example 16 may include the device of example 15 and/or some other example herein, wherein to identify the indication of the arrival comprises the processing circuitry being further configured to determine vehicle sensor data indicating a status of a door of the vehicle.

Example 17 may include the device of example 15 and/or some other example herein, wherein to identify the indication of the arrival comprises the processing circuitry being further configured to determine vehicle seat sensor data indicating that a passenger has departed the vehicle after the first time.

Example 18 may include the device of example 15 and/or some other example herein, the processing circuitry being further configured to: identify a destination received from the second mobile device; and determine location information associated with the vehicle, wherein to identify the indication of the arrival comprises the processing circuitry being further configured to determine that the vehicle has arrived at the destination based at least in part on the location information.

Example 19 may include the device of example 15 and/or some other example herein, wherein the movement data indicates a first distance between the device and the vehicle and a second distance between the second device and the vehicle.

Example 20 may include the device of example 15 and/or some other example herein, wherein a user is associated with at least one of the device or the second device, and wherein the movement data indicates a number of steps associated with the user.

Example 21 may include the device of example 15 and/or some other example herein, wherein the movement data indicates first location information associated with the device and second location information associated with the second device.

Example 22 may include the device of example 15 and/or some other example herein, wherein the movement data indicates first movement data associated with the device and second movement data associated with the second device, wherein to determine that one of the second device or the device is disposed in the vehicle and the other respective device is not disposed in the vehicle comprises the processing circuitry being further configured to determine that a difference between the first movement data and the second movement data exceeds a threshold amount.

Example 23 may include the device of example 15 and/or some other example herein, wherein at least a portion of the movement data is received from the vehicle.

Example 24 may include the device of example 15 and/or some other example herein, the processing circuitry being further configured to identify a received indication of a time period associated with retrieval of the device or the second mobile device.

Example 25 may include an apparatus comprising: means for causing to establish a wireless communication connection with a vehicle; means for identifying an indication of an arrival of the vehicle at a destination, wherein the apparatus and a second apparatus are disposed inside the vehicle at a first time associated with the arrival; means for determining, at a second time after the first time, movement data associated with the apparatus and the second apparatus; means for determining, based at least in part on the movement data, that one of the second apparatus or the apparatus is disposed in the vehicle and the other respective device is not disposed in the vehicle; and means for causing to send an indication to the second apparatus that one of the apparatus or the second apparatus is disposed in the vehicle.

Example 26 may include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 27 may include an apparatus comprising logic, modules, and/or circuitry to perform one or more elements of a method described in or related to any of examples 1-25, or any other method or process described herein.

Example 28 may include a method, technique, or process as described in or related to any of examples 1-25, or portions or parts thereof.

Example 29 may include an apparatus comprising: one or more processors and one or more computer readable media comprising instructions that, when executed by the one or more processors, cause the one or more processors to perform the method, techniques, or process as described in or related to any of examples 1-25, or portions thereof.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
    determining, by one or more processors coupled to memory of a first mobile device, an indication associated with an arrival of a vehicle at a destination, wherein the first mobile device and a second mobile device are disposed inside the vehicle at a first time associated with the arrival;
    determining, by the one or more processors, at a second time after the first time, movement data associated with the first mobile device and the second mobile device;
    determining, by the one or more processors, based at least in part on the movement data, that one of the second mobile device or the first mobile device is disposed in the vehicle and the other of the second mobile device and first mobile device is not disposed in the vehicle;
    causing to send, by one or more processors, an indication to the second mobile device that one of the first mobile device or the second mobile device is disposed in the vehicle, wherein causing to send the indication comprises causing to send a first indication of a time period associated with retrieval of the first mobile device or the second mobile device;
    determining that the second mobile device is outside the vehicle;
    determining the second mobile device is within a proximity threshold of the vehicle before expiration of the time period; and
    unlocking a door of the vehicle.

2. The method of claim 1, wherein determining the indication associated with the arrival comprises determining vehicle sensor data indicating a status of a door of the vehicle.

3. The method of claim 1, wherein determining the indication associated with the arrival comprises determining vehicle seat sensor data indicating that a passenger has departed the vehicle after the first time.

4. The method of claim 1, further comprising:
identifying a destination received from the first mobile device or the second mobile device; and
determining location information associated with the vehicle, wherein determining the indication associated with the arrival comprises determining that the vehicle has arrived at the destination based at least in part on the location information.

5. The method of claim 1, wherein the movement data indicates a first distance traveled since the indication associated with the arrival and a second distance traveled since the indication associated with the arrival.

6. The method of claim 1, wherein the movement data indicates a number of steps.

7. The method of claim 1, wherein the movement data indicates first location information associated with the first mobile device and second location information associated with the second mobile device.

8. The method of claim 1, wherein the movement data indicates first movement data associated with the first mobile device and second movement data associated with the second mobile device, wherein determining that one of the second mobile device or the first mobile device is disposed in the vehicle and the other respective device is not disposed in the vehicle comprises determining that a difference between the first movement data and the second movement data exceeds a threshold amount.

9. The method of claim 1, further comprising:
determining the second device is not within a proximity threshold of the vehicle before expiration of the time period; and
causing an extension of the time period.

10. The method of claim 1, further comprising:
identifying a received indication that a user will not retrieve the first mobile device from the vehicle; and
causing to send an indication of a location or a time when the user may retrieve the first mobile device from the vehicle.

11. The method of claim 1, further comprising:
identifying a received indication that a user will not retrieve the first mobile device from the vehicle; and
causing to send an instruction to a third mobile device indicating a location to leave the first mobile device.

12. The method of claim 1, wherein the second device is a wireless wearable device.

13. A device comprising storage coupled to one or more processors configured to:
determine an indication associated with an arrival of a vehicle at a destination, wherein the device and a second device are disposed inside the vehicle at a first time associated with the arrival;
determine, at a second time after the first time, movement data associated with the device and the second device;
determine, based at least in part on the movement data, that one of the second device or the device is disposed in the vehicle and the other respective device is not disposed in the vehicle; and cause to send an indication to the second device that one of the device or the second device is disposed in the vehicle, wherein causing to send the indication comprises causing to send a first indication of a time period associated with retrieval of the first mobile device or the second mobile device;
determine that the second mobile device is outside the vehicle;
determine the second mobile device is within a proximity threshold of the vehicle before expiration of the time period; and
unlock a door of the vehicle.

14. The device of claim 13, wherein to determine the indication associated with the arrival comprises the one or more processors being further configured to determine vehicle sensor data indicating a status of a door of the vehicle.

15. The device of claim 13, wherein to determine the indication associated with the arrival comprises the one or more processors being further configured to determine vehicle seat sensor data indicating that a passenger has departed the vehicle after the first time.

16. The device of claim 13, the one or more processors being further configured to:
identify a destination received from the second mobile device; and
determine location information associated with the vehicle, wherein to determine the indication associated with the arrival comprises the one or more processors being further configured to determine that the vehicle has arrived at the destination based at least in part on the location information.

17. The device of claim 13, wherein the movement data indicates a first distance traveled since the indication associated with the arrival and a second distance traveled since the indication associated with the arrival.

18. A method comprising:
determining, by one or more processors coupled to memory of a first mobile device, an indication associated with an arrival of a vehicle at a destination, wherein the first mobile device and a second mobile device are disposed inside the vehicle at a first time associated with the arrival;
determining, by the one or more processors, at a second time after the first time, movement data associated with the first mobile device and the second mobile device;
determining, by the one or more processors, based at least in part on the movement data, that one of the second mobile device or the first mobile device is disposed in the vehicle and the other of the second mobile device and first mobile device is not disposed in the vehicle;
causing to send, by one or more processors, an indication to the second mobile device that one of the first mobile device or the second mobile device is disposed in the vehicle, wherein causing to send the indication comprises causing to send a first indication of a time period associated with retrieval of the first mobile device or the second mobile device;
determining that the second mobile device is outside the vehicle;
determining the second device is not within a proximity threshold of the vehicle before expiration of the time period; and
causing an extension of the time period.

* * * * *